A. DE KHOTINSKY.
ELECTRICALLY HEATED INCUBATOR.
APPLICATION FILED MAR. 31, 1917.
1,325,834.
Patented Dec. 23, 1919.
3 SHEETS—SHEET 1.
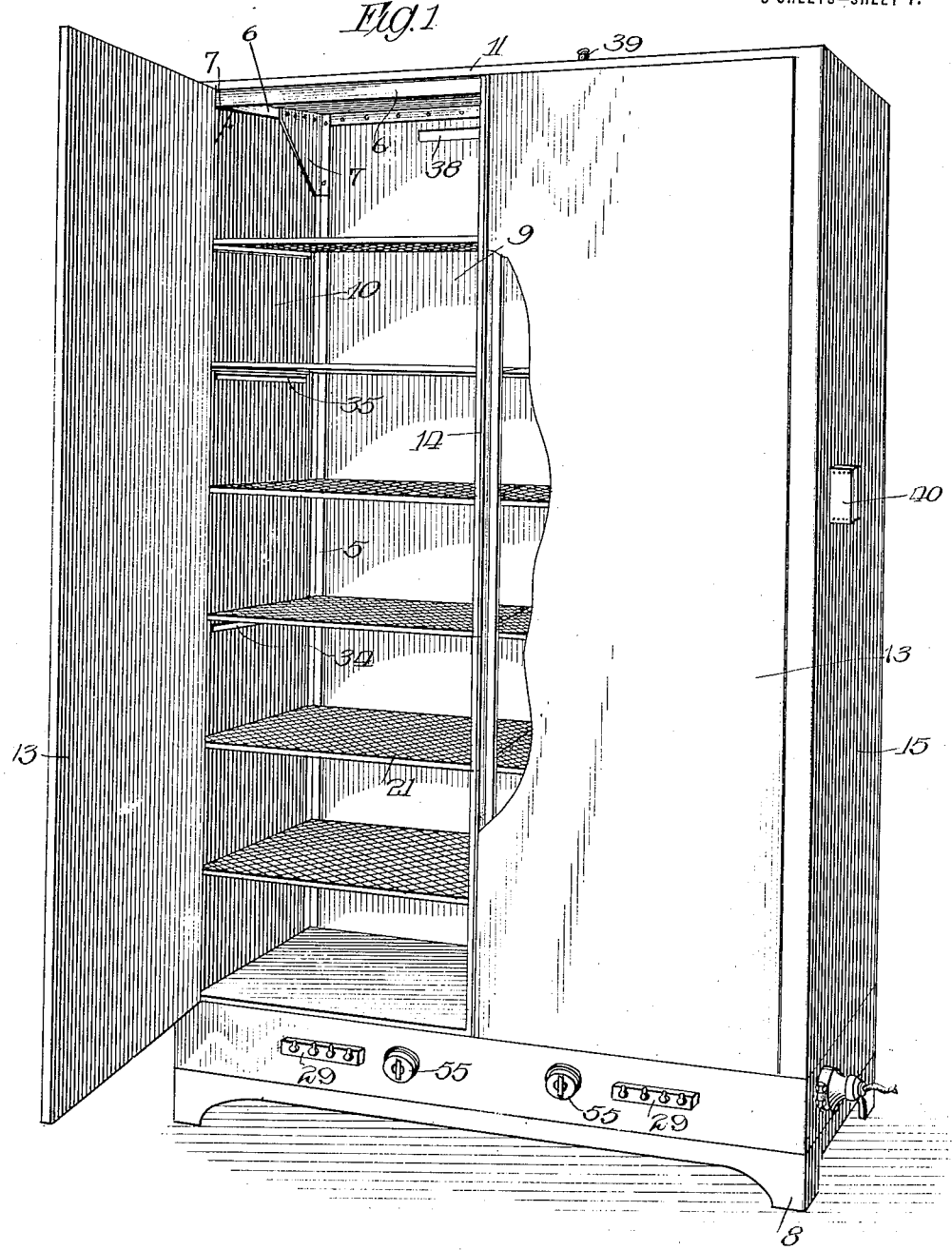

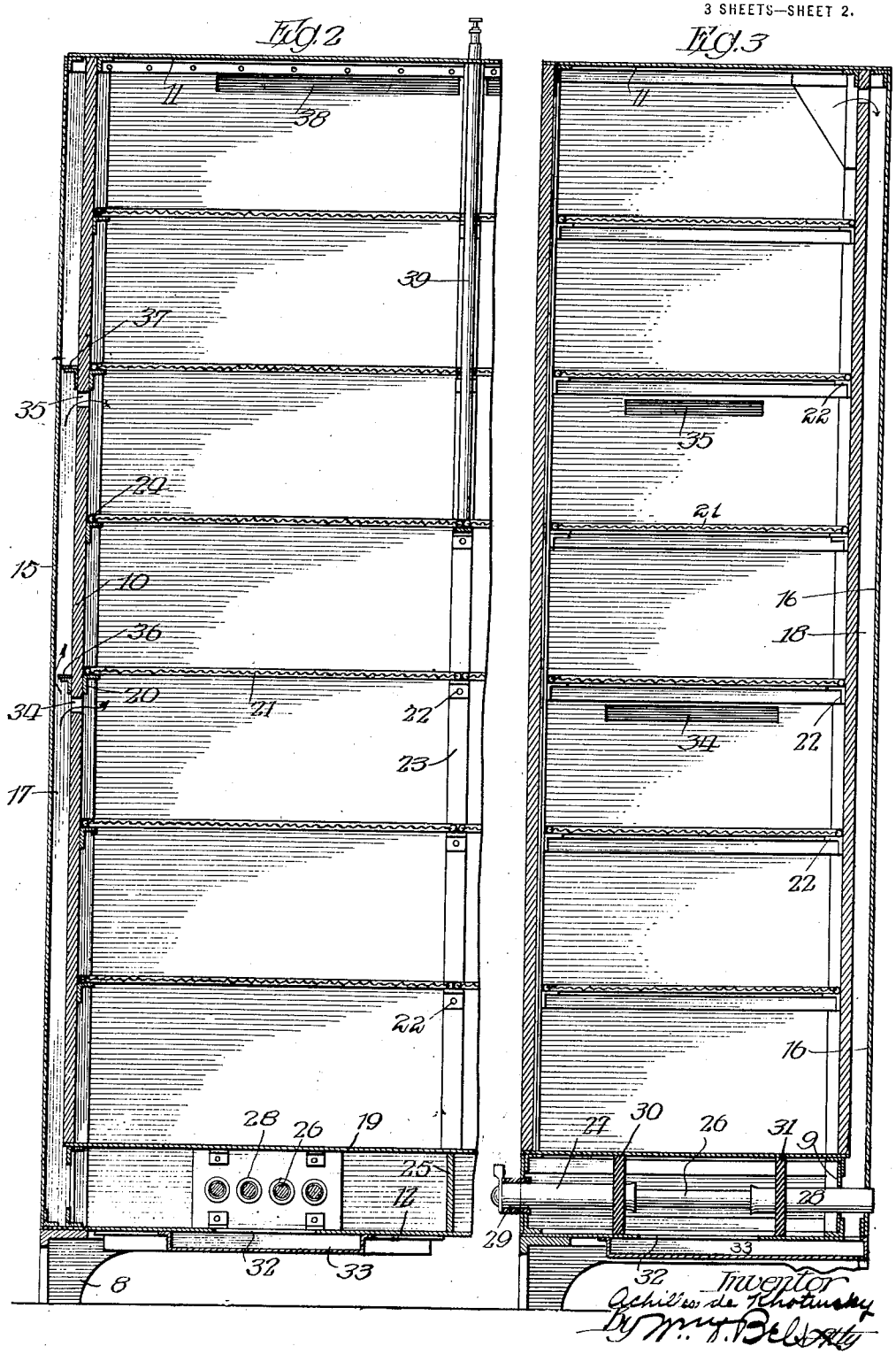

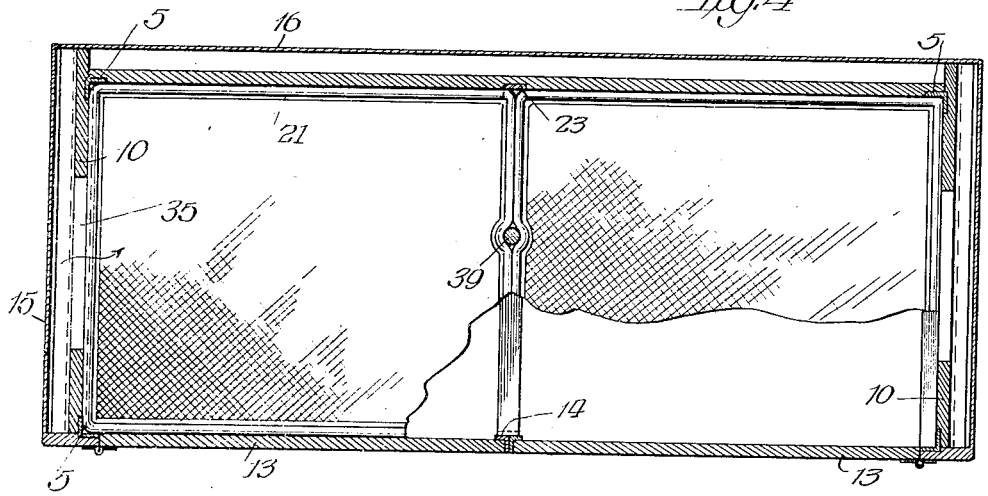
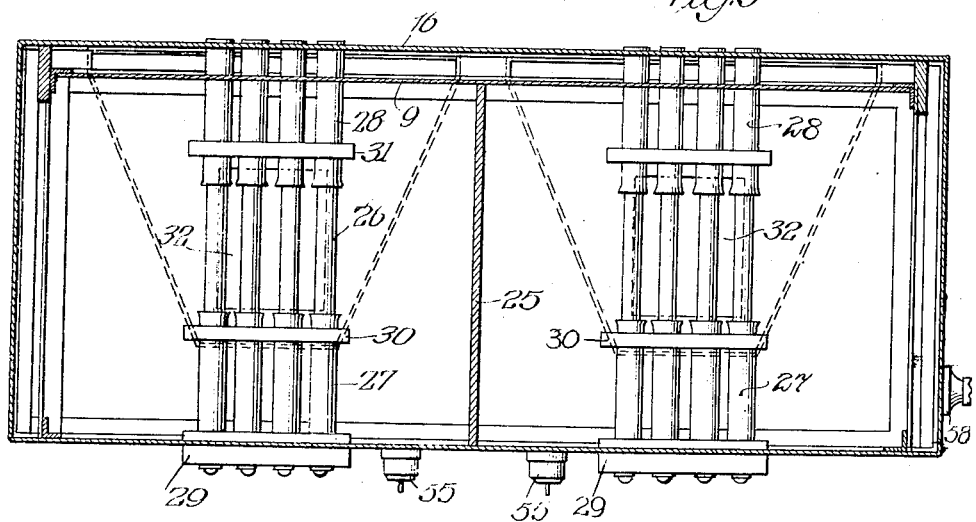
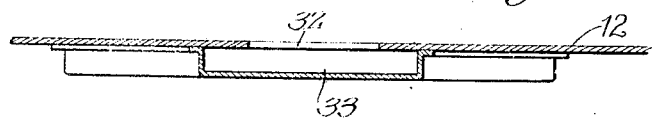

UNITED STATES PATENT OFFICE.

ACHILLES DE KHOTINSKY, OF CHICAGO, ILLINOIS, ASSIGNOR TO CENTRAL SCIENTIFIC COMPANY, OF CHICAGO, ILLINOIS, A CORPORATION OF ILLINOIS.

ELECTRICALLY-HEATED INCUBATOR.

1,325,834.     Specification of Letters Patent.     Patented Dec. 23, 1919.

Application filed March 31, 1917. Serial No. 158,802.

*To all whom it may concern:*

Be it known that I, ACHILLES DE KHOTINSKY, a citizen of the United States, residing at Chicago, in the county of Cook and State of Illinois, have invented certain new and useful Improvements in Electrically-Heated Incubators, of which the following is a specification.

In conducting experimental work in laboratories and particularly in pursuing the study of bacteriology an apparatus in which an exact predetermined temperature may be maintained continuously for long periods of time is essential and it is desirable that the apparatus require a minimum of attention. Thus the attendant is relieved from responsibility and the possibility of error due to inattention or wilful neglect is eliminated. The primary difficulty experienced with apparatus of this character is the lack of uniformity of the temperature in different sections of the heating chamber. The warmer air tends naturally to rise and consequently the temperature at the top of the chamber is several degrees higher than at the bottom.

It is an object of my invention to provide an incubator and heating means therefor automatically controlled to maintain the temperature of the heating chamber at a predetermined point continuously and without attention after the primary adjustment of the controlling mechanism.

A further object of my invention is the provision of an incubator and means for heating and delivering warm air to the chamber in a manner to insure the distribution of the heat so that a uniform temperature is maintained throughout the chamber.

A still further object of my invention is the provision of an electrically heated incubator and means for permitting a continuous circulation of air between the heating elements and the chamber and for distributing the warm air as it is delivered from the heating elements to the chamber.

Further objects and advantages of my invention will be apparent as it is better understood by reference to the following specification when read in connection with the accompanying drawing illustrating the preferred embodiment thereof, in which—

Figure 1 is a view in perspective of the incubator, one of the doors being open to exhibit the interior construction;

Fig. 2 is a vertical longitudinal section through one end of the incubator;

Fig. 3 is a vertical transverse section through the incubator;

Fig. 4 is a horizontal section through the incubator;

Fig. 5 is a horizontal section through the base of the incubator showing the heating elements in position;

Fig. 6 is a detail in section through the bottom of the incubator and one of the air-conveying flues.

Referring to the drawing 5 and 6 indicate vertical and horizontal members preferably of angle iron connected to form a rectangular frame and reinforced where necessary by gusset plates 7. The base 8 supports the frame to which the rear walls 9, end walls 10, top 11 and bottom 12 are secured. The walls may be constructed of sheets of any suitable material which is preferably non-heat-conducting in order that the loss of heat through radiation may be minimized. Doors 13 are hingedly secured to the front of the frame and are adapted to engage, when closed, a member 14 comprising two angle irons extending from the top to the bottom thereof with their abutting flanges outwardly directed. Obviously the details of construction of the frame and the form and manner of supporting the doors may be widely varied without departing from the invention.

The inner shell above described which forms the heating chamber is inclosed at the ends and back by walls 15 and 16, preferably constructed of the same non-heat-conducting material as the walls 9 and 10. The walls 15 and 16 are spaced from the walls 9 and 10 to form flues 17 and 18 separated from each other but affording communication between the interior of the heating chamber and the air-heating compartment formed by a false floor 19 and the bottom 12. Supported by the frame within and at the sides of the chamber are a plurality of transverse angle irons 20 spaced apart to support the ends of shelves 21, the opposite ends of which rest on brackets 22 secured to the member 14 and to a strap 23 fastened to the inner face of the rear wall of the chamber.

The shelves 21 are constructed of wire mesh preferably bound at the edges by suitable metallic binding strips 24. The shelves permit unobstructed circulation of air within the chamber and serve to support various receptacles containing material stored within the chamber during treatment.

The air heating compartment is divided by a transverse partition 25 into two sections in each of which a plurality of heating elements 26 are disposed. These heating elements are preferably substantially identical with those described in my Patent No. 1,208,756, December 19, 1916, and are supported in tubes 27 and 28. The tubes 27 are supported at one end in insulating blocks 29 inserted in the front wall of the air-heating compartment and at their rear ends by upright members 30. The tubes 28 are similarly supported at one end by upright members 31 and extend through the walls 9 and 16 so that should a heating element become broken it may be readily removed by inserting a suitable tool in its supporting tube 28. The bottom 12 is provided with openings 32 beneath the respective sets of heating elements and a flue 33 is secured to the bottom 12 beneath each of the openings 32 and extends rearwardly therefrom communicating with the flue 18 as illustrated in Fig. 3.

To distribute air rising in the flues 17 from the air-heating chamber I provide inlets 34 and 35 consisting of elongated slots in the walls 10 spaced from each other and from the false bottom 19 and in the present embodiment disposed directly beneath the third and fifth shelves, respectively, from the false bottom 19. The inlet 35 is shorter than the inlet 34 so that its effective area is diminished. Immediately above the inlets 34 in the flues 17 baffles 36 partially close the flues so that the rising column of warm air is deflected through the inlets into the chamber. A portion of the air, however, passes the baffles 36 and rises until it meets the baffles 37 disposed immediately above the inlets 35 and wholly closing the flues 17. The column of air is thus entirely deflected and caused to enter the chamber through the inlets 35. The lower portion of the chamber is heated by radiation through the false bottom 19 and I find that the distribution of the heated air in the manner described results in the maintenance of the uniform temperature throughout the chamber. Obviously the number of inlets and their relative positions and sizes may be varied so long as the essential relation herein expressed is maintained.

To permit circulation of the air I provide outlets 38 in the rear wall 9 communicating with the flue 18 which in turn communicates with the flues 33 and thence through the openings 32 the air is again distributed about the heating elements 26 and after being reheated passes again to the flues 17 for redistribution in the chamber, the circulation being continuous.

From the foregoing it will be readily understood that I have perfected an incubator, which by reason of the mode of distributing the heated air insures a uniform temperature throughout the heating chamber. My apparatus embodies numerous other advantages which recommend it for use where treatment of material under precise conditions of temperature control is desired.

It will be apparent that various changes may be made in the form, construction and arrangement of the parts without departing from the spirit and scope of the invention or sacrificing any of its material advantages, the form hereinbefore described being merely a preferred embodiment thereof.

I claim:

1. An incubator comprising a chamber, an air-heating compartment, electric heating means in said compartment, means for conveying heated air from said compartment to said chamber including vertically spaced inlets from said conveying means to said chamber, and means external to the chamber and the compartment and comprising a flue for permitting air in the upper portion of said chamber to return to said compartment.

2. An incubator comprising a chamber, an air-heating compartment, electric heating means in said compartment, a flue leading from said compartment and provided with vertically spaced inlets connecting said flue and chamber, baffles in said flue adjacent said inlets to deflect the column of heated air and cause it to enter said chamber, and means external to the chamber and the compartment and comprising a flue for permitting air in the upper portion of said chamber to return to said compartment.

3. An incubator comprising a chamber, an air-heating compartment, electric heating means in said compartment, a flue leading from said compartment and provided with vertically spaced inlets connecting said flue and chamber, a baffle partially closing said flue adjacent the lowermost inlet and a baffle wholly closing said flue adjacent the uppermost inlet, and means external to the chamber and the compartment and comprising a flue for permitting the air in the upper portion of said chamber to return to said compartment.

4. An incubator comprising a chamber, an air-heating compartment, electric heating means in said compartment, a flue leading from said compartment, vertically spaced inlets connecting said flue and chamber, the areas of said inlets decreasing progressively from the lowermost upward, baffles in said flue adjacent said inlets to deflect the column of heated air and cause it to enter said chamber, and means external to the chamber and the compartment and comprising a flue for permitting the air in the upper portion of said chamber to return to said compartment.

5. An incubator comprising a chamber having double end and rear walls spaced apart to form flues, a false bottom in said chamber forming a compartment communicating directly with the flues between said end walls, electric heating means in said compartment, a plurality of vertically spaced inlets connecting said flues and chamber, baffles in said flues adjacent said inlets to deflect the column of heated air and cause it to enter said chamber, an outlet from said chamber adjacent the top thereof communicating with the flue between the rear walls of said chamber, and means connecting said last-mentioned flue and said compartment.

6. An incubator comprising a chamber having double end and rear walls spaced apart to form flues, a false bottom in said chamber forming a compartment communicating directly with the flues between said end walls, electric heating means in said compartment, a plurality of vertically spaced inlets connecting said flues and chamber, the area of said inlets decreasing progressively from the lowermost upward, baffles adjacent said inlets to deflect the column of heated air and cause it to enter said chamber, an outlet from said chamber adjacent the top thereof communicating with the flue between the rear walls of said chamber, and means connecting said last mentioned flue and said compartment.

7. An incubator comprising a chamber, a compartment, electric heating means in said compartment, a vertical flue leading from said compartment, an inlet spaced from the bottom of said chamber and connecting said flue thereto, a baffle partially closing said flue adjacent said inlet, a second inlet of smaller area and above the first, a baffle wholly closing said flue adjacent said second inlet, and means external to the chamber and the compartment and comprising a flue for permitting air in the upper portion of said chamber to return to said compartment.

ACHILLES DE KHOTINSKY.

Witnesses:
  WM. O. BELT,
  M. A. KIDDIE.